Jan. 30, 1934.  J. D. JONES  1,944,936
BEARING FOR ELECTRIC MOTORS AND THE LIKE
Filed Aug. 15, 1931
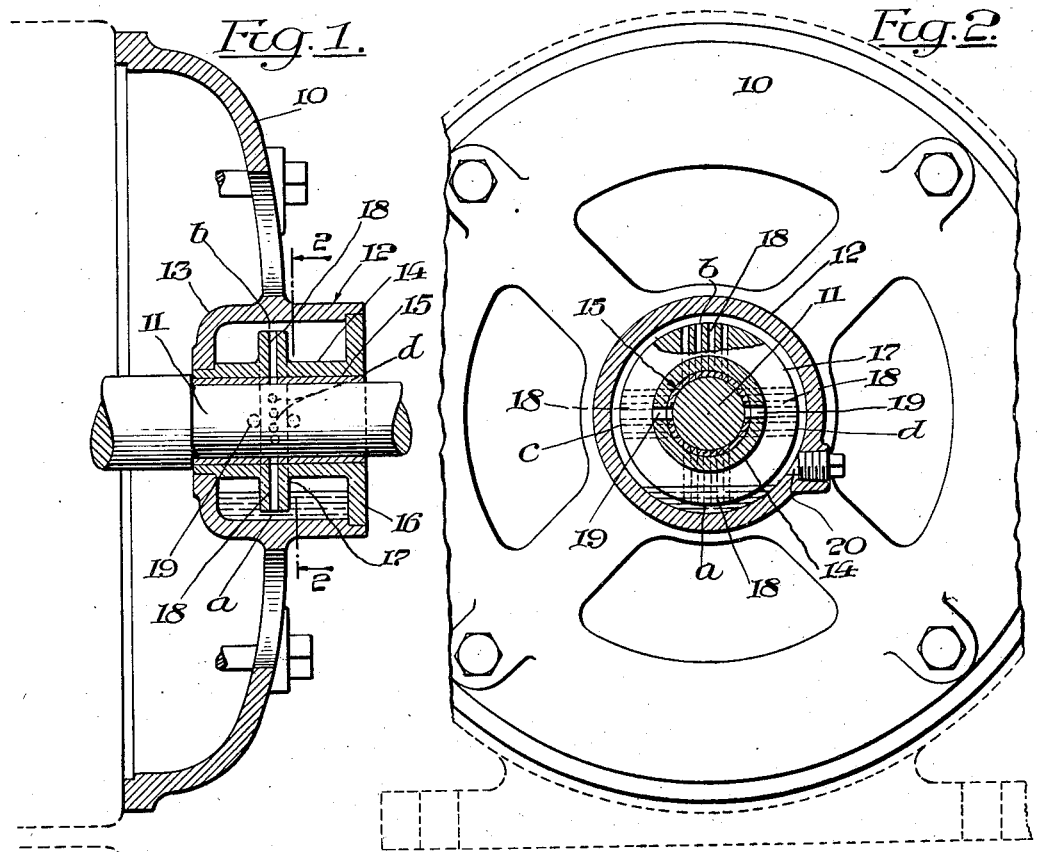
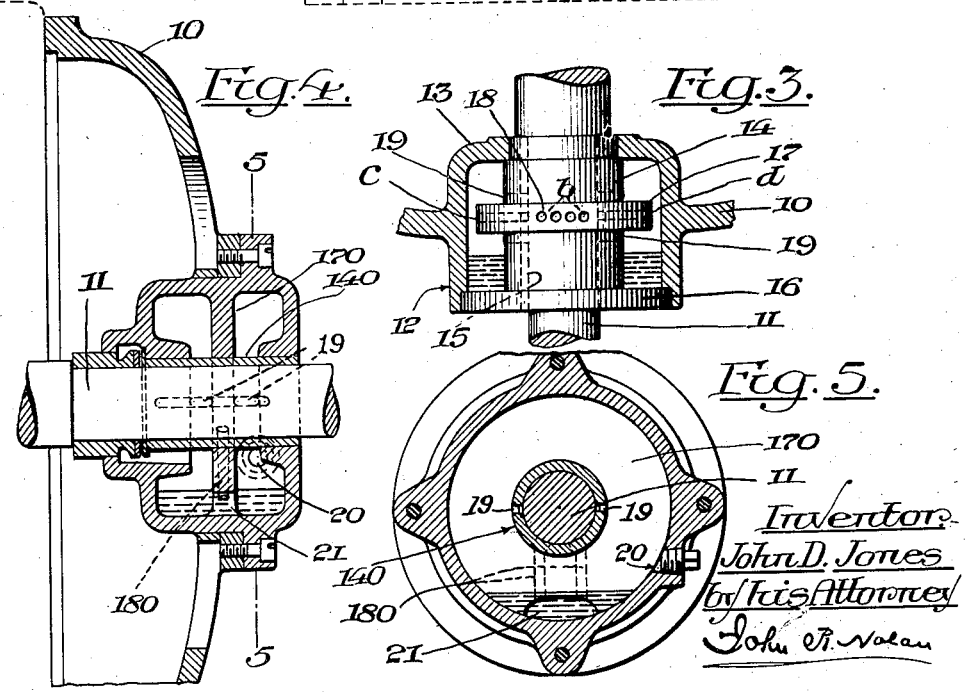
Inventor
John D. Jones
by his Attorney
John R. Nolan Patented Jan. 30, 1934

1,944,936

UNITED STATES PATENT OFFICE 1,944,936

BEARING FOR ELECTRIC MOTORS AND THE LIKE

John D. Jones, Portland, Oreg.

Application August 15, 1931. Serial No. 557,203

9 Claims. (Cl. 308—131)

This invention relates to bearings, having particular reference to self-lubricating bearings for electric motors and other apparatus.

The object of the invention is to provide a bearing having a lubricant-containing reservoir so constructed and arranged as to obviate liability of leakage of the lubricant therefrom irrespective of the position of the apparatus to which the bearing is applied, whereby such apparatus can be safely shipped with a pre-supply of lubricant to ensure the efficient lubrication of the bearing when the apparatus is installed, and whereby also the bearing shall be self-lubricating, yet non-leakable, in various placements of the apparatus, that is, normally upright, upside down or laterally-disposed.

With this and other objects in view my invention comprises a bearing housing embodying features of novelty which will be hereinafter described; the scope of the invention then being defined in the appended claims.

In the drawing—

Figure 1 is a longitudinal vertical section of one end of an electric motor casing equipped with a bearing housing embodying the principle of my invention, the journal of the motor shaft being shown.

Fig. 2 is a transverse vertical section through the housing, as on the line 2—2 of Fig. 1.

Fig. 3 is a sectional elevation of the housing when the motor is turned on its end showing the level of the lubricant below the supply ducts leading to the shaft.

Fig. 4 is a sectional view similar to Fig. 1 of a modified form of the bearing housing.

Fig. 5 is a transverse vertical section, as on the line 5—5 of Fig. 4.

Referring to the drawing, 10 designates one of the ends of the casing of an electric motor, for example, which end is provided with a self-lubricating, non-leaking bearing element for the rotor shaft 11 of the motor. This element, in the preferred form shown in Figs. 1, 2 and 3, includes a cylindrical housing body within which an oil reservoir is formed. This reservoir is formed by an outer cylindrical shell 12 on which a centrally-perforated end wall or head 13 is formed, and a cylindrical member or inner shell 14 having preferably an interior liner or bushing 15 in the bore thereof, which affords a bearing for the shaft, is supported within the housing. The member 14 has at one end a flange or end wall 16 which is snugly fitted in the open end of the body or shell 12 to provide a sealing closure therefor while the opposite end of the member 14 is supported in the central perforation of the head or end wall 13. The bearing member or shell 14 has formed thereon intermediate its ends a circumferential flange or extension 17 of slightly less diameter than the interior of the body or shell 12, which flange constitutes a partition dividing the reservoir into two oil compartments communicating with each other at the periphery of the flange. This flange 17 and the liner 15 are provided at spaced intervals with sets of ducts 18 which lead from the periphery of the flange to the bearing surface for the shaft. In the present instance there are four sets of ducts, that is, vertical ducts a, b below and above the shaft, respectively, and horizontal ducts c, d at the respective sides of the shaft. The bearing member and its liner are provided laterally of the partition flange 17 with scavenging holes 19 which afford communication between the bearing surface and the reservoir.

The body 12 is provided in its lower lateral portion with a filler opening 20 through which oil is supplied to the reservoir before the motor is shipped for service, said opening having a suitable screw plug. The oil level within the reservoir is slightly above the outer edge of the extension or adjacent peripheral portion of the flange 17 and the bottoms of the associated ducts, and hence when the motor is in operation the relative rotation between the shaft and the inner surface of the bearing liner causes a pump action effective to circulate the oil through the adjacent set of ducts between the reservoir and the shaft, the surplus oil on the shaft escaping through the holes 19 and passing to the reservoir wherein it is cooled before being again pumped upward to the bearing surface.

It will be seen that by the described arrangement of plural sets of ducts in the partition flange 17 circulation of the oil between the reservoir and the bearing surface is established in various operative positions of the motor or other apparatus while it is in service, thus insuring the effective lubrication of the bearing under varying placement conditions, as previously mentioned.

It will also be seen that by virtue of the relative position of the partition flange 17 and the inner walls of the reservoir leakage of the oil from the latter is effectually prevented, and hence the apparatus can be safely shipped with a pre-supply of oil in the reservoir, thus ensuring the primary lubrication of the shaft bearing when the apparatus is installed and operated. In Fig. 3 the position of the bearing when the motor or other apparatus is placed on end is shown, in which case the level of the oil is below the partition flange and its ducts. Obviously the same position of the oil relative to the flange and its ducts obtains when the endwise position of the apparatus is reversed.

In Figs. 4 and 5 is shown a modification wherein the housing comprises a separate structure which is bolted to the centrally perforated end of the casing, said structure having therein an integral partition web 170 in the lower portion of which is a transverse opening 21 which affords communication between the two compartments of the reservoir. A sleeve or bushing 140 fixed in and between the end heads of the housing constitutes the bearing for the rotor shaft 11, which bushing has in its lower side a series of perforations in registry with the vertical ducts 180, thus establishing communication between the interior of the bearing and the reservoir. The bushing is also provided with suitably-disposed scavenging holes 19.

With this modified construction of self-lubricating bearing, leakage of the oil contained in the reservoir is prevented irrespective of the position of the motor or other apparatus to which the bearing is applied thus enabling the safe shipment of the apparatus with the reservoir supplied with oil, as in the first-described construction.

While in the exemplifying forms of my invention herein disclosed a single partition is provided in the reservoir, it is to be understood that a plurality of spaced partitions may be employed to meet the requirements of bearings of different lengths, and also that in other respects the construction may be modified within the principle of the invention and the scope of the appended claims.

I claim—

1. A non-leaking self-lubricating bearing comprising a cylindrical housing having end heads and constituting an oil reservoir, a shaft-bearing member extending through and encased by said housing, an extension encircling the bearing member and formed to provide communication between the lower portions of the compartments of the reservoir formed by said extension and having also oil circulating ducts leading from the oil-containing portion of the reservoir to the interior of the shaft-bearing member.

2. A non-leaking self-lubricating bearing comprising a cylindrical housing having an end head, a shaft-bearing member extending through and encased by said housing, one end of said member being fitted in the end head of the housing and the other end having a flange fitted in and sealing the open end of the housing, an extension encircling the bearing member and constructed to divide the interior of the housing into compartments with communicating lower portions, said extension having oil circulating ducts leading from the lower portion of the partition means to the interior of the shaft-bearing member.

3. A non-leaking self-lubricating bearing comprising a cylindrical housing having an end head, a shaft-bearing member extending through and encased by said head, one end of said member being fitted in the end head of the housing and the other end having a flange fitted in and sealing the open end of the housing, an extension encircling the bearing member and peripherally spaced from the inner wall of the housing, said extension having oppositely-disposed sets of oil circulating ducts extending from its periphery to the interior of the bearing member.

4. A non-leaking self-lubricating bearing comprising a sealed cylindrical oil reservoir, a shaft-bearing member extending through said reservoir, and partition means encircling said bearing member and peripherally spaced from the inner walls of the reservoir, said partition means having oppositely-disposed sets of oil circulating ducts extending from its periphery to the interior of the bearing member.

5. A non-leaking self-lubricating bearing comprising a sealed cylindrical housing containing centrally perforated partition means having a transverse opening in the lower portion thereof and having ducts extending from said opening to the central perforation of the partition means, and a bearing member extending through the interior of the housing and supported by the ends of the latter and the partition means, said bearing member having holes in registry with the ducts.

6. A non-leakable self-lubricating bearing comprising a casing having inner and outer shells, the inner shell having a bore therethrough for the reception of a shaft, there being a relatively large space between the shells and surrounding the inner shell, remotely spaced end walls extending from shell to shell forming a closed lubricant chamber between the shells and end walls, an extension on the inner shell spaced from the end walls and extending towards the bottom of the chamber to a point below the normal oil level therein, there being a lubricant feeding duct extending through the extension from the chamber to the bore of the inner shell to feed oil to the shaft in the bore, there also being a scavenging duct leading through the inner shell from the bore to the said chamber, the outer end of the scavenging duct being nearer the center of the bearing than the outer end of the lubricating duct, the volume of the space in the chamber on each side of the extension and scavenging ducts being sufficient for the reception of the oil in the chamber when the bearing is turned on end to maintain the lever of the oil below the plane of the ducts.

7. A non-leakable self-lubricating bearing comprising a casing having inner and outer annular shells, the inner shell having a bore therethrough for the reception of a shaft, there being a relatively large annular space between the shells and surrounding the inner shell, remotely spaced end walls extending from shell to shell forming a closed lubricant chamber between the shells and end walls, an extension on the inner shell spaced from the end walls and extending towards the bottom of the chamber to a point below the normal oil level therein, there being a lubricant feeding duct extending through the extension from the chamber to the bore of the inner shell to feed oil to the shaft in the bore, there also being a scavenging duct leading through the inner shell from the bore to the said chamber, the outer end of the scavenging duct being nearer the center of the bearing than the outer end of the lubricating duct, the volume of the space in the chamber on each side of the extension and scavenging ducts being sufficient for the reception of the oil in the chamber when the bearing is turned on end to maintain the level of the oil below the plane of the ducts.

8. A non-leakable self-lubricating bearing comprising a casing having inner and outer shells, the inner shell having a bore therethrough for the reception of a shaft, there being a relatively large space between the shells and surrounding the inner shell, remotely spaced end walls extending from shell to shell forming a closed lubricant chamber between the shells and end walls, an extension on the inner shell spaced from the end walls and extending towards the outer shell to a point adjacent thereto, there being a lubricant feeding duct extending through the extension from the chamber to the bore of the inner shell to feed oil to the shaft in the bore, there also being a scavenging duct leading through the inner shell from the bore to the said chamber, the outer end of the scavenging duct being nearer the center of the bearing than the outer end of the lubricating duct, the volume of the space in the chamber on each side of the extension and scavenging ducts being sufficient for the reception of the oil in the chamber when the bearing is turned on end to maintain the level of the oil below the plane of the ducts.

9. A non-leakable self-lubricating bearing comprising a casing having inner and outer shells, the inner shell having a bore therethrough for the reception of a shaft, there being a relatively large annular space between the shells and surrounding the inner shell, remotely spaced end walls extending from shell to shell forming a lubricant chamber between the shells and end walls, an extension on the inner shell spaced from the end walls and extending toward the outer shell to a point adjacent thereto, there being a plurality of lubricant feeding ducts extending through the extension from the chamber to the bore of the inner shell to feed oil to the shaft in the bore, said ducts extending at an angle to each other, so that at least one of said ducts will extend downwardly into the oil regardless of the position of the bearing if the axis thereof is in a horizontal plane, there also being a plurality of scavenging ducts at the side of the lubricating ducts leading through the inner shell from the bore to said chamber, the outer end of the scavenging ducts being nearer the center of the bearing than the outer ends of the lubricating ducts, the volume of space in the chamber on each side of the extension and scavenging ducts being sufficient for the reception of the oil in the chamber when the bearing is turned on end to maintain the level of the oil below the plane of the ducts.

JOHN D. JONES.